United States Patent [19]

Best et al.

[11] 4,444,484

[45] Apr. 24, 1984

[54] PHOTOGRAPHIC CASSETTE AND DISPENSING METHOD

[75] Inventors: David E. Best; John J. Niedospial, both of Rochester, N.Y.

[73] Assignee: Eastman Kodak Company, Rochester, N.Y.

[21] Appl. No.: 411,226

[22] Filed: Aug. 25, 1982

[51] Int. Cl.³ .............................................. G03B 17/26
[52] U.S. Cl. ................................... 354/276; 378/182; 206/455
[58] Field of Search ........................ 354/276, 277, 212; 378/182, 183, 185, 186, 187, 188, 175; 206/455

[56] References Cited

U.S. PATENT DOCUMENTS

| | | | |
|---|---|---|---|
| 992,205 | 5/1911 | Kelley | 378/175 |
| 3,330,953 | 7/1967 | Erikson | 378/187 |
| 3,652,853 | 3/1972 | Williner et al. | 378/182 |
| 3,784,835 | 1/1974 | Schmidt | 378/187 |
| 3,836,783 | 9/1974 | Stievenart et al. | 378/188 |
| 3,955,092 | 5/1976 | Hubert | 206/455 |
| 4,198,009 | 4/1980 | Turner | 378/187 |
| 4,248,172 | 2/1981 | Krobel et al. | 206/455 |
| 4,383,330 | 5/1983 | DeFelice et al. | 378/187 |
| 4,388,992 | 6/1983 | Deconinck | 354/276 |

*Primary Examiner*—A. A. Mathews
*Attorney, Agent, or Firm*—William C. Dixon

[57] ABSTRACT

A cassette of the type having opposing interior surfaces relatively movable toward and away from each other to prevent and permit, respectively, movement of a photographic sheet therebetween, and having at one end an opening through which the sheet can pass along an exit path, has at its opposite end a device engageable with a corner of the sheet remote from the opening and movable at an angle with the exit path to urge the sheet obliquely toward and against a side wall of the cassette, so as to induce buckling of the sheet and consequent separation thereof from the interior surfaces, thereby facilitating succeeding movement of the sheet along the exit path and out through the opening. The device is externally accessible for manual actuation, and the extent to which it can be moved without encountering sheet resistance indicates, visually and tactilely, whether or not a sheet is in the cassette.

25 Claims, 12 Drawing Figures

SECTION A—A

SECTION B—B

PHOTOGRAPHIC CASSETTE AND DISPENSING METHOD

BACKGROUND OF THE INVENTION

1. Field of the Invention

The present invention relates generally to photographic cassettes, and particularly to a device and method usable with such cassettes for facilitating removal of a photographic sheet therefrom.

2. Description of the Prior Art

U.S. Pat. Nos. 3,784,835 and 4,198,009 describe x-ray film sheet cassettes of a type suitable for daylight loading and unloading in cooperation with film supplying and film processing apparatus. Such cassettes typically have a rectangular-solid configuration defined by six orthogonally joined walls which enclose a chamber for accommodating an x-ray film sheet. In one of those walls is a light-shielded slot through which a film sheet can pass into and out of the chamber. Within the chamber, in alignment with the slot, is a pair of opposing planar surfaces relatively movable toward and away from each other to prevent and permit, respectively, movement of a film sheet therebetween. One of those surfaces is spring-loaded toward the other to clamp a film sheet flat between them. Means are provided for urging the two surfaces apart in response to placing the cassette into operative relationship with suitably configured film supplying or film processing apparatus, thereby allowing a film sheet to slide between those surfaces when the cassette is positioned for loading or unloading. When so positioned, the cassette is intended to be loaded or unloaded by the simple expedient of letting a film sheet drop into or out of the chamber by force of gravity.

It has been found that gravity alone does not always suffice to effect desired unloading when such a cassette is appropriately positioned with its slot facing downward and its planar surfaces spread apart. This is believed due primarily to a lack of air between the sheet and one of those surfaces, resulting in a state of contact between the sheet and the one surface which may best be described as "pseudo-optical" in both nature and effect. The effect in this case has been a tendency of the sheet to cling to that one surface, rather than simply fall away from it.

There has thus existed a need for an efficient and reliable way to prevent or overcome that tendency. Efforts to meet this need by roughening the planar surfaces have not proven entirely successful. Attempts at nudging the sheet directly toward the cassette slot likewise have not succeeded in overcoming the clinging effect. This need has remained unresolved by all such past endeavors.

SUMMARY OF THE INVENTION

The present invention fulfills the foregoing need by providing a simple, inexpensive, efficient, and reliable way of overcoming the stated tendency of a photographic sheet to cling to a cassette internal surface during attempted unloading. The invention embraces both a cassette improvement for facilitating sheet removal and a method of using that improvement to readily achieve such removal.

The invention thus has utility in a photographic cassette, the cassette having one end with a slot therein through which a photographic sheet is movable along an exit path, another end opposite the one end, one side joined to and forming a corner with other end, and another side opposite the one side. In accordance with the invention, an improvement to facilitate removal of the sheet includes means mounted near the corner and engageable with the sheet for moving the sheet obliquely, relative to the exit path, into buckling engagement with the other side prior to movement of the sheet along the exit path and through the slot.

The invention also has utility in a method for readily dispensing a photographic sheet from a cassette, the cassette including an end wall with a slot therein through which the sheet is movable along an exit path, a side wall substantially perpendicular to the end wall, opposing front and rear cover walls joined to the end and side walls, first and second substantially planar interior surfaces disposed between the cover walls in substantially parallel facing relationship with each other to support the sheet therebetween, pressure-applying means biasing the first surface toward the second surface to press the sheet flat against the second surface, and pressure-relieving means actuatable to urge the first surface away from the second surface and thereby relieve the sheet of pressure applied to it. The method in this case comprises the steps of: orienting the cassette vertically with its end wall facing downward; actuating the pressure-relieving means to urge the first surface away from the second surface; and moving the sheet between the two surfaces, in a direction oblique to the exit path, into buckling engagement with the side wall, to effect an air gap between the sheet and one of those surfaces and consequent separation of the sheet from the surfaces, thereby freeing the sheet for succeeding movement by force of gravity along the exit path and out through the slot.

The invention, and its objects and advantages, will become more apparent in the detailed description of the preferred embodiment presented below.

BRIEF DESCRIPTION OF THE DRAWINGS

In the detailed description of the preferred embodiment of the invention presented below, reference is made to the accompanying drawings, wherein like reference numerals denote like elements and wherein:

FIG. 3 is an interior view of a vertical section through a side wall of the cassette of FIG. 1, showing various components as they are positioned when the cassette is closed;

FIG. 4 is an interior view similar to FIG. 3 but showing the various components as they are positioned when the cassette is open;

DESCRIPTION OF THE PREFERRED EMBODIMENT

Because certain parts of photographic cassettes and related apparatus are well known, the following description is directed in particular to those elements forming, cooperating directly with, or relating to the present invention. Elements not specifically shown or described herein are selectable from those known in the art.

Figure 1:
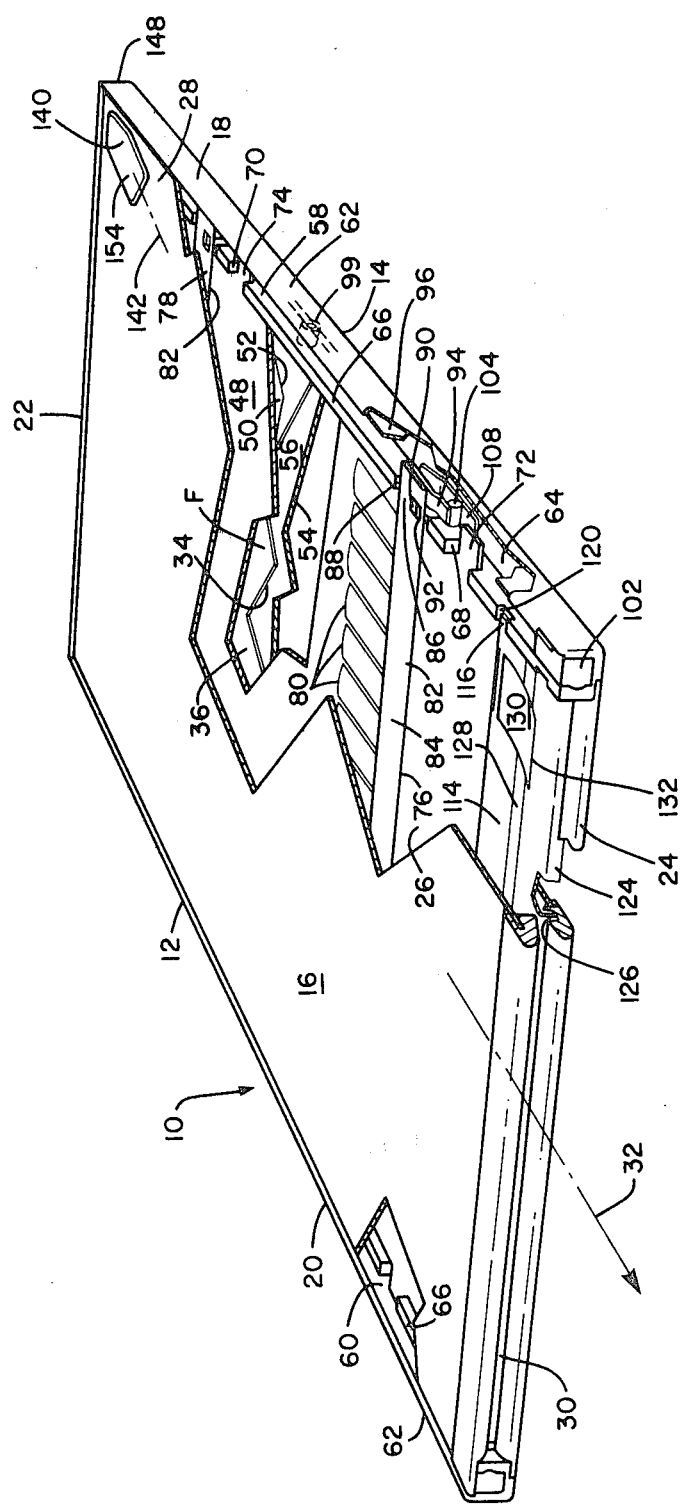
FIG. 1 is a perspective view, partly broken away, of a photographic cassette constructed in accordance with the preferred embodiment of the present invention.

Illustrated in FIG. 1 is a photographic cassette 10 designed to hold a film sheet F for exposure when positioned in operative relation to a source of x-ray radiation. The cassette includes a rectangular-solid-shaped housing 12 defined by six opaque walls 14, 16, 18, 20, 22, 24, which are joined as shown to enclose a chamber 26 for accommodating the film sheet. Opposing front and rear walls 14, 16 are spaced from and parallel with each other so that when the cassette is oriented for an exposure, front wall 14 faces the radiation source and rear wall 16 lies behind the film sheet. Joined to front and rear walls 14, 16 are opposing side walls 18, 20 and opposing end walls 22,24. Front and rear walls 14, 16 together with side wall 18 and end wall 22 define a corner portion 28 of housing 12 which is diagonally opposite the juncture of side wall 20 and end wall 24. End wall 24 has a light-shielded elongate opening or slot 30 therein through which the film sheet can pass along a film path 32 into and out of chamber 26.

Figure 2:
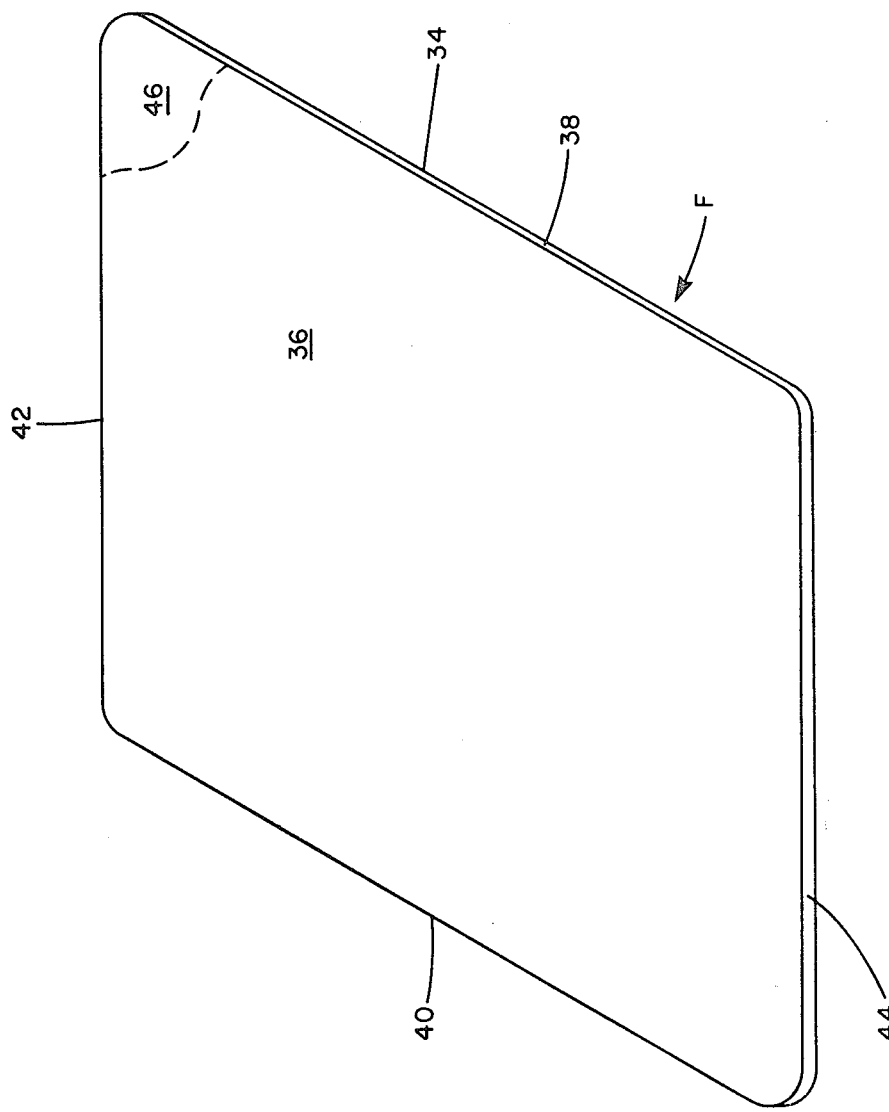
FIG. 2 is a perspective view of a film sheet suitable for use in the cassette of FIG. 1.

In similar fashion, as illustrated in FIG. 2, film sheet F has a generally rectangular configuration defined by its front and rear surfaces 34,36 parallel side edges 38, 40, and parallel end edges 42, 44 which are substantially perpendicular to the side edges. Front and rear surfaces 34, 36 together with side edge 38 and end edge 42 define a corner part 46 of film sheet F which is diagonally opposite the juncture of side edge 40 and end edge 44. When film sheet F is operatively disposed in chamber 26, its front and rear surfaces 34, 36 lie substantially parallel with front and rear walls 14, 16, its side edges 38, 40 lie substantially alongside side walls 18, 20 respectively, its end edges 42, 44 lie near end walls 22, 24 respectively, and its corner part 46 lies within corner portion 28.

Located inside housing 12, between and substantially parallel with front and rear walls 14, 16, is a pressure plate 48 made of magnesium or aluminum and mounted for movement toward and away from front wall 14. Secured to the front of plate 48 is a sheet-like intensifier screen 50 similar in size and shape to film sheet F and having a forward-facing, substantially planar surface 52. Secured to the back of front wall 14 is a similar screen 54 having a rearward-facing, substantially planar surface 56. Planar surfaces 52 and 56 thus face toward each other, so as to face film sheet surfaces 36 and 34, respectively, when film sheet F is operatively disposed between the two screens.

As shown in FIG. 1, housing side walls 18, 20 are U-shaped in cross section, as a result of channels 58, 60, respectively, extending longitudinally therein from a closed end at wall 22 to an open end at wall 24. Although the following description refers only to features of and parts associated with channel 58, it will be understood that the same description applies to corresponding features of and parts associated with channel 60. Channel 58 may be viewed as bounded on three sides by outer, medial, and inner sections 62, 64, 66, respectively, of side wall 18. Spaced along inner section 66 are two rectangular cut-outs 68, 70 opening toward rear wall 16. Cut-outs 68, 70 are positioned and dimensioned to receive, loosely, a pair of tabs 72, 74 extending laterally from pressure plate 48, so as to locate plate 48 and screen 50 in registration with screen 54 and also guide movement of the plate and screen 50 toward and away from screen 54 as the tabs ride forward and rearward, respectively, in the cut-outs.

Figures 3, 4:
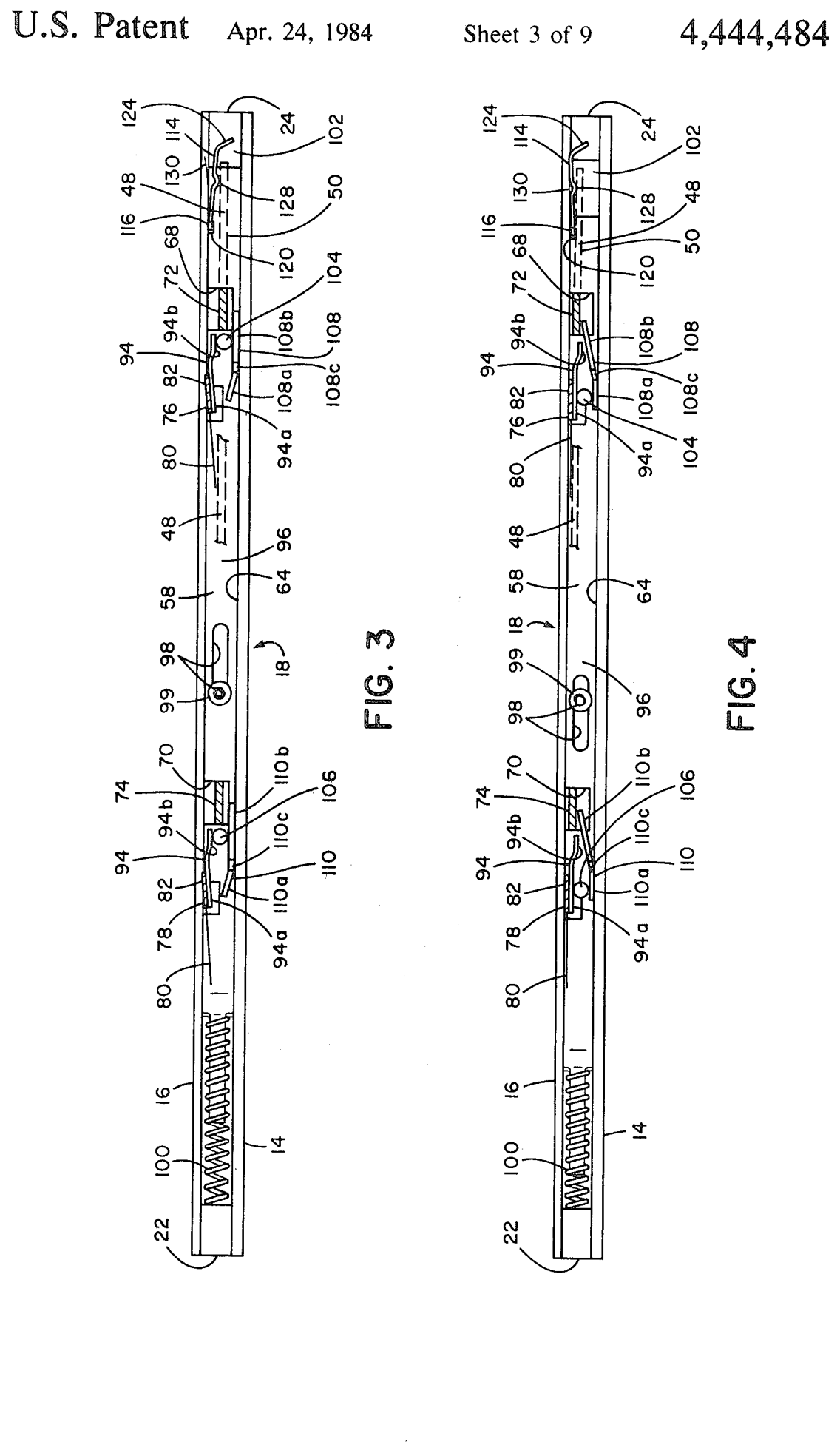

Biasing plate 48 forwardly, i.e., toward front wall 14, is a pair of spring assemblies 76, 78 mounted between plate 48 and rear wall 16. Larger cassettes may have three or four such spring assemblies. Each spring assembly comprises a plurality of leaf springs 80 projecting longitudinally toward end wall 22 from a connecting rod 82 which extends transversely from side wall 18 to side wall 20. Each rod 82 may be bowed concave-forward/convex-rearward so that rear wall 16 presses forwardly on the middle portion 84 of each rod, thus tending to flatten the bow and thereby urge leaf springs 80 against the back of plate 48. The laterally extending end portion 86 of rod 82 is loosely received by a cut-out 88 provided in inner section 66, and is located therein by a small projection 90 on section 66 protruding rearwardly through a mating aperture 92 in end portion 86. End portion 86 terminates in a rocker arm 94 which lies perpendicular to rod 82 and projects longitudinally toward end wall 24 in registration with medial section 64. As shown in FIGS. 3 and 4, rocker arm 94 comprises two arms 94a, 94b which are joined to form a generally obtuse angle therebetween. Arm 94a is secured to the end of rod 82, and arm 94b projects from arm 94a toward end wall 24. Means are provided in channel 58 for rocking rocker arm 94, and with it the whole spring assembly, so as to decrease or increase the spring force biasing plate 48 toward front wall 14.

The above-mentioned rocking means comprises an elongate push bar 96 mounted, by means of a conventional pin-and-slot arrangement 98, for longitudinal sliding movement toward and away from end wall 24. To facilitate such movement, a spacing and guiding roller 99 is rotatably mounted in channel 58 between bar 96 and inner section 66 as shown. Biasing bar 96 toward end wall 24 is a compression spring 100 disposed in channel 58 near end wall 22 and pushing against one end of the bar. Fixed to the opposite end of the bar is an actuator button 102 which normally lies in the open end of channel 58 flush with end wall 24. Bar 96 thus can be moved away from end wall 24, toward end wall 22, by pushing upon button 102 with enough force to overcome the opposing biasing influence of spring 100.

Carried by bar 96 is a pair of rollers 104, 106 which are freely rotatable about axes substantially perpendicular to side wall 18. Rollers 104, 106 are positioned on bar 96 for cooperation with spring assemblies 76, 78 respectively. Larger cassettes having more than two spring assemblies would have a like number of rollers on bar 96 suitably positioned for cooperation therewith. In the normal, unactuated position of bar 96, shown in FIG. 3, wherein button 102 lies flush with end wall 24, rollers 104, 106 are located immediately beneath, and support, the free end of arm 94b of each spring assembly. When button 102 is depressed so as to move bar 96 to its actuated position, shown in FIG. 4, rollers 104, 106 are moved out from under arm 94b, and into engagement with arm 94a of each spring assembly, thereby camming arm 94a toward, and arm 94b away from, rear wall 16. This motion of rocker arm 94 causes connecting rod 82 to pivot leaf springs 80 in a direction away from plate 48, so as to decrease the spring force biasing plate 48 toward front wall 14. Similarly, when the actuating force on button 102 is removed and bar 96 is returned by spring 100 to its normal position shown in FIG. 3, the rollers 104, 106 are moved out from under arm 94a, and into engagement with arm 94b, of each spring assembly, thereby camming arm 94b toward, and arm 94a away from, rear wall 16. This return motion of rocker arm 94 then causes connecting rod 82 to pivot the leaf spring 80 back toward plate 48, so as to increase the spring force biasing plate 48 toward front wall 14.

Figure 5:
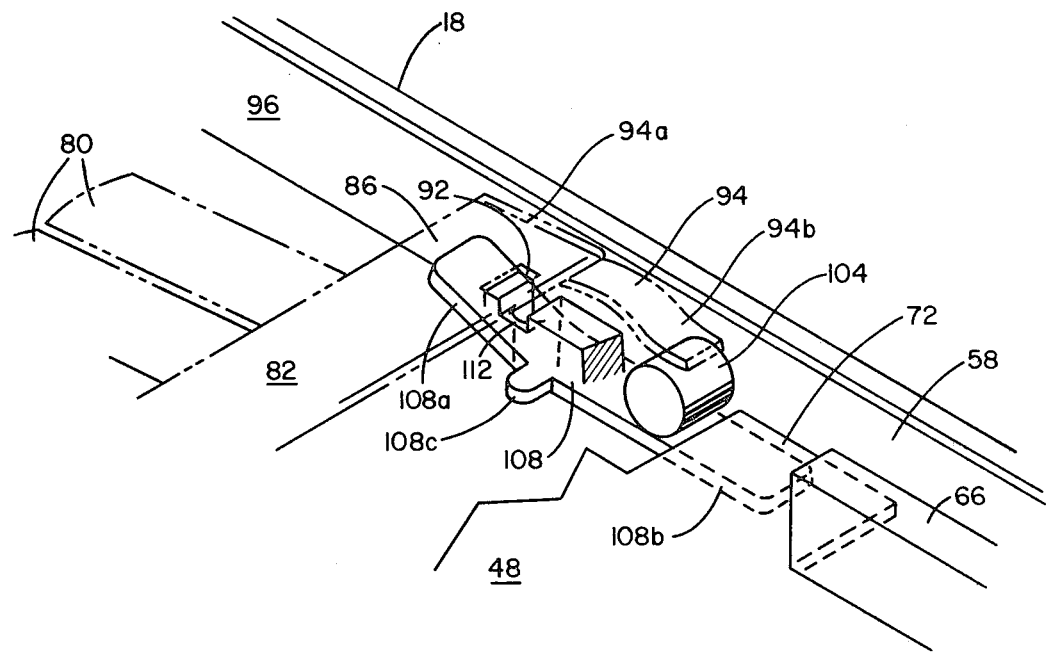
FIG. 5 comprises two partial perspective views, 5.1 and 5.2, revealing details of certain components positioned as shown in FIG. 3.
Figure 5:
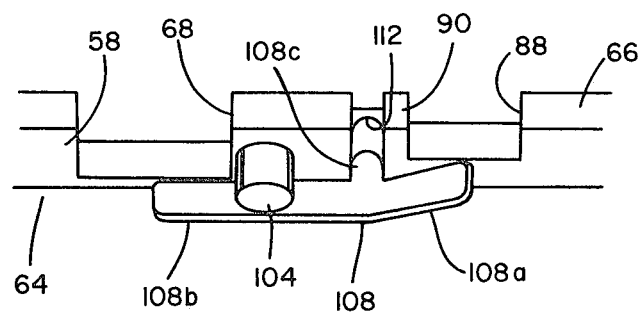
Figure 6:
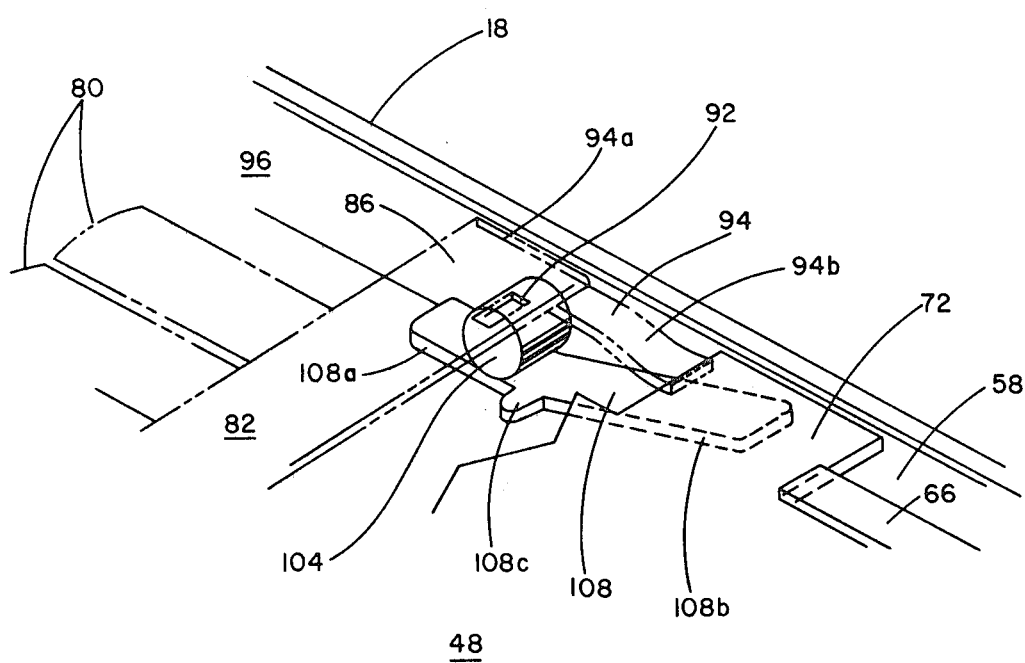
FIG. 6 is a partial perspective view similar to view 5.1 of FIG. 5 but showing the components as positioned in FIG. 4.

Spaced along medial section 64, in registration with the rocker arms 94 of spring assemblies 76, 78, the rollers 104, 106, and the tabs 72, 74 of plate 48, is a pair of bellcrank levers 108, 110. It should be noted here that larger cassettes provided with more than two spring assemblies would have not only a like number of rollers on bar 96 but also the same number of tabs on plate 48 and as many bellcrank levers registered therewith, as will become readily apparent from the description that follows. Because levers 108, 110 are identical in both structure and function, only lever 108 will be described. It should be understood, however, that lever 110 cooperates with roller 106 and tab 74 in the same manner as lever 108 cooperates with roller 104 and tab 72. Lever 108 comprises two longitudinally projecting arms 108a, 108b, which are joined to form an obtuse angle therebetween, and a laterally projecting tab 108c. As shown in FIG. 5, tab 108c is received by a mating cut-out 112 provided in inner section 66 to locate lever 108 so that arm 108a faces arm 94a while arm 108b faces both arm 94b and tab 72. In the normal, unactuated position of bar 96 shown in FIGS. 3 and 5, roller 104 bears upon the mid-section of arm 108b so as to hold that arm down against medial section 64 while arm 108a projects angularly therefrom toward arm 94a. It will be noted that in this position of bar 96, roller 104 keeps arms 108b and 94b substantially parallel with each other and arms 108a and 94a converging toward each other. In this position, the spring assemblies acting upon the pressure plate keep the film sheet pressed flat between screens 50 and 54. As bar 96 is pushed to its actuated position shown in FIGS. 4 and 6, roller 104 is moved both out from under arm 94b and out from over arm 108b, and then into engagement with both arms 94a and 108a, thereby camming arms 94a and 108a away from each other and arms 94b and 108b toward each other. As explained above, such motion of rocker arm 94 tends to unload the spring force upon the pressure plate. The simultaneous motion of bellcrank lever 108 causes upward-swinging arm 108b thereof to engage and lift tab 72 and thereby urge the pressure plate and screen 50 away from screen 54. In this position of bar 96, therefore, the two screens are spread apart, and the film sheet between them is thus relieved of the spring pressure previously applied to it by the pressure plate.

Referring again to FIGS. 1, 3, and 4, near end wall 24 and extending parallel therewith from side wall 18 to side wall 20 is a light shield 114 configured and disposed to shield the film sheet from any light that might enter chamber 26 through slot 30. Shield 114 is rockably mounted between plate 48 and rear wall 16 with a tab 116 projecting laterally from each end thereof loosely received by a mating cut-out 120 in the inner section 66 of each side wall. Shield 114 has a lip 124 which projects angularly and forwardly toward a groove 126 adjacent to slot 30 and a rib 128 which protrudes from the front of shield 114 toward plate 48. Secured to and projecting from the rear of shield 114 are two or more leaf springs 130 (only one shown), each having a free end portion 132 extending angularly toward and bearing resiliently upon rear wall 16, so as to bias shield 114 in a direction toward front wall 14. In the normal, unactuated position of bar 96 shown in FIGS. 1 and 3, wherein plate 48 and screen 50 hold the film sheet flat against screen 54, springs 130 keep shield 114 in its forward, light-shielding position, wherein lip 124 is held in groove 126 so as to block passage of any light through slot 30. In this condition the cassette is said to be closed. When bar 96 is actuated to urge plate 48 and screen 50 away from screen 54, as shown in FIG. 4, the rear of plate 48 engages rib 128 and pushes shield 114 rearwardly, against the biasing influence of springs 130, until lip 124 has left groove 126 and cleared slot 30, thereby allowing the film sheet to move out from between screens 50 and 54, toward end wall 24, past shield 114, and thence through slot 30. In this condition the cassette is said to be open.

As discussed above under BACKGROUND OF THE INVENTION, a film sheet that has been pressed flat by two facing planar surfaces sometimes clings to one of those surfaces after they have been spread apart, whereby the film sheet fails to move freely between such surfaces if unaided by the device and method of this invention. The preferred embodiment of that device is shown in the drawings and referred to herein as either a film moving and indicating device or, simply, a moving means or, more simply, a pusher.

Figure 7:
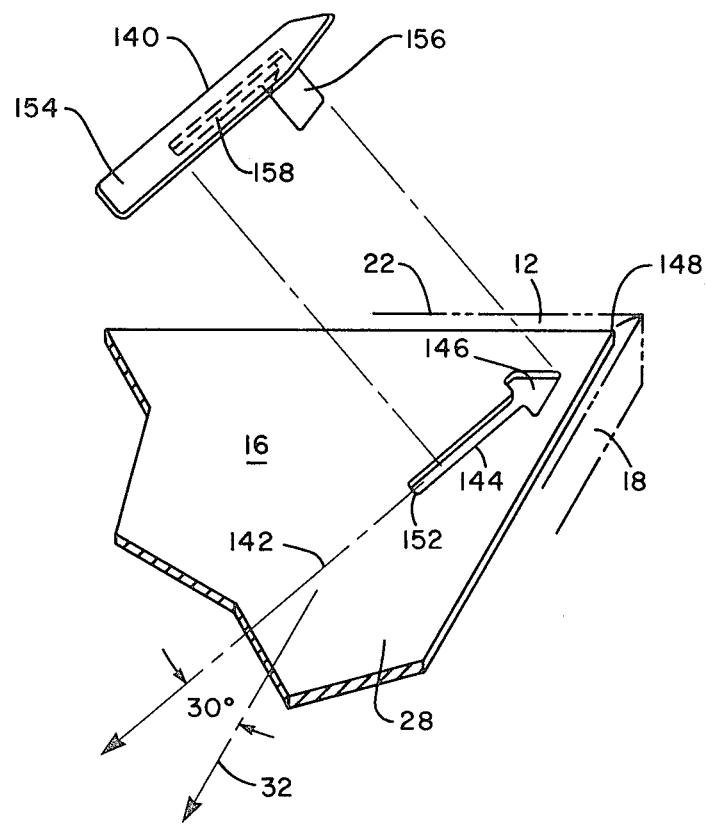
FIG. 7 is a partial perspective view of a corner portion of the cassette of FIG. 1, showing removed therefrom a film moving and indicting device configured according to the preferred embodiment of the present invention.

Referring now to FIGS. 1 and 7, a pusher 140 is mounted in corner portion 28 of cassette housing 12 for sliding movement along an oblique rectilinear path 142 which lies at an acute angle relative to film path 32. Path 142 is defined by a slot 144 formed in rear wall 16. Slot 144 extends from an irregular-shaped end 146 near the juncture 148 of side wall 18 and end wall 22, in a direction generally toward the diagonally opposite juncture of side wall 20 and end wall 24, to its opposite end 152. The actual acute angle at which slot 144 lies relative to film path 32 in this embodiment is 30 degrees. Although not shown herein, it has been found that an angle of 45 degrees works equally well in overcoming the aforementioned clinging effect. Still other acute angles, such as others falling within a range of 15 to 60 degrees relative to path 32, should likewise prove effective for the purposes of this invention.

Figure 8:
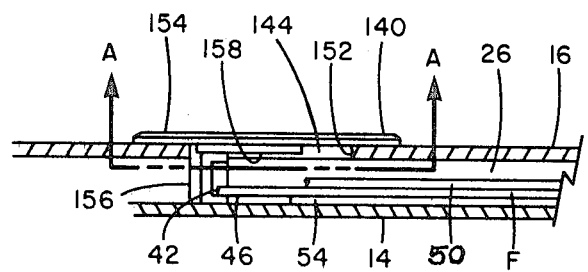
FIG. 8 comprises two fragmentary sectional views, an upper view taken vertically through the cassette corner portion of FIG. 7 but showing the film moving and indicating device as it is normally mounted therein, and a lower view taken along line A—A of the upper view to show certain details of that device.
Figure 8:
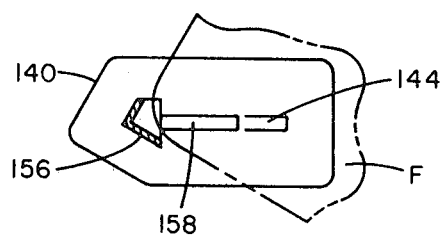
Figure 9:
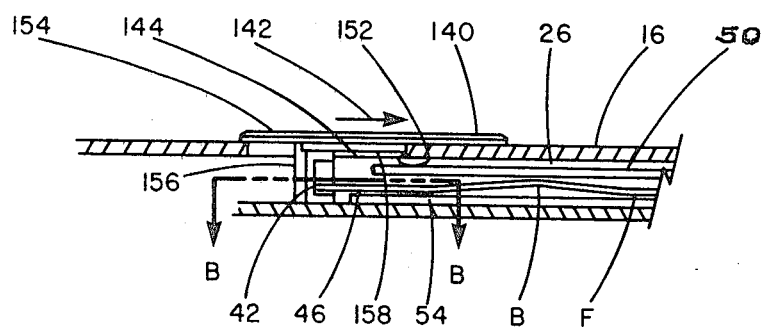
FIG. 9 comprises two fragmentary sectional views similar to those of FIG. 8, the upper view showing the film moving and indicating device in its fully advanced position, the lower view taken along line B—B of the upper view to show the device in that position and engaged with a corner part of the film sheet.
Figure 9:
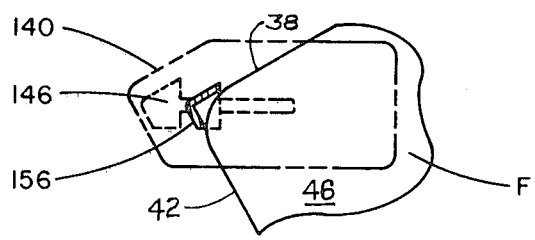

As shown in FIGS. 7, 8, and 9, pusher 140 comprises three functional parts: (1) an externally accessible flat part 154 which covers slot 144 in a light-tight manner and is manually actuatable by the user; (2) an internally extending L-shaped part 156 which passes through irregular-shaped end 146 into chamber 26 and is engageable with film sheet corner part 46 at edges 38, 42 thereof; and (3) an intermediate part 158 which interconnects parts 154, 156 and is matingly received in slot 144 so as to be guided thereby along path 142 as part 154 is actuated. During assembly of cassette 10, pusher 140 is positioned in slot 144 by first passing part 156 through end 146 and then sliding part 158 along the slot toward end 152 until part 156 becomes trapped under the narrow linear portion of the slot, after which rear wall 16 is moved to its fully assembled position relative to the other walls of housing 12, in which position part 156 is prevented from moving back into alignment with and out through end 146.

Figure 10:
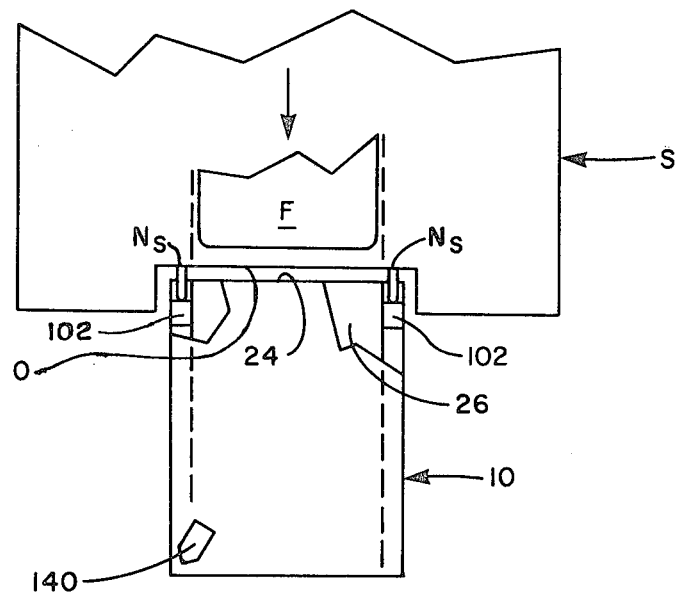
FIG. 10 is a schematic view of the cassette of FIG. 1 disposed in cooperative relationship with film supplying apparatus.

In operation, as depicted schematically in FIG. 10 the cassette first is loaded with film sheet F by positioning the cassette in cooperative relationship with suitably configured film supplying apparatus S. When so positioned, end wall 24 is joined in light-tight relation to such apparatus so that slot 30 is aligned with a film sheet outlet O thereon and buttons 102 are aligned with a pair of actuating pins Ns adjacent to the outlet. When the cassette and apparatus are thus joined, the outlet is opened, buttons 102 are engaged and depressed by the pins so as to urge bars 96 to their actuated positions, and the film sheet is caused to move in the direction of the arrow from within the apparatus, through the outlet and now-opened slot 30, to its operative position in chamber 26 between now-separated screens 50 and 54. When loading has been accomplished, the cassette is removed from the supplying apparatus with slot 30 closed and film sheet F held flat between the two screens, both conditions resulting from the return of bars 96 to their normal positions. The cassette is then ready for use with x-ray exposing apparatus (not shown) to obtain a desired x-ray photograph.

During the final portion of the film loading movement, film sheet corner part 46 may engage pusher part 156 and nudge it back toward slot end 146 if the pusher has not previously been moved to its initial position near that end. When a film sheet is present in its operative position, as partially revealed in FIGS. 1 and 8, pusher 140 can be moved toward slot end 152 along only a portion of its full path of travel before encountering film sheet resistance; whereas absent a film sheet, the pusher can be moved freely through its entire path of travel without any such resistance. In the illustrated embodiment, the portion of travel obtainable without such resistance when a film sheet is present is approximately one-half the full path of travel so obtainable when a film sheet is not present. Pusher 140 thus enables the user to sense, visually and tractilely, whether or not a film sheet is present, and therefore serves as a convenient-to-use film presence/absence indicator.

Figure 11:
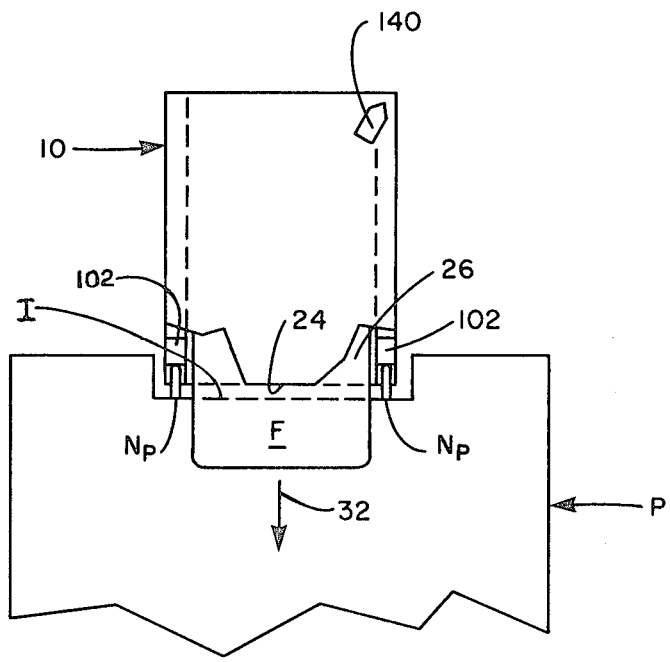
FIG. 11 is a schematic view similar to FIG. 10 but showing the cassette in cooperative relationship with film processing apparatus.
Figure 12:
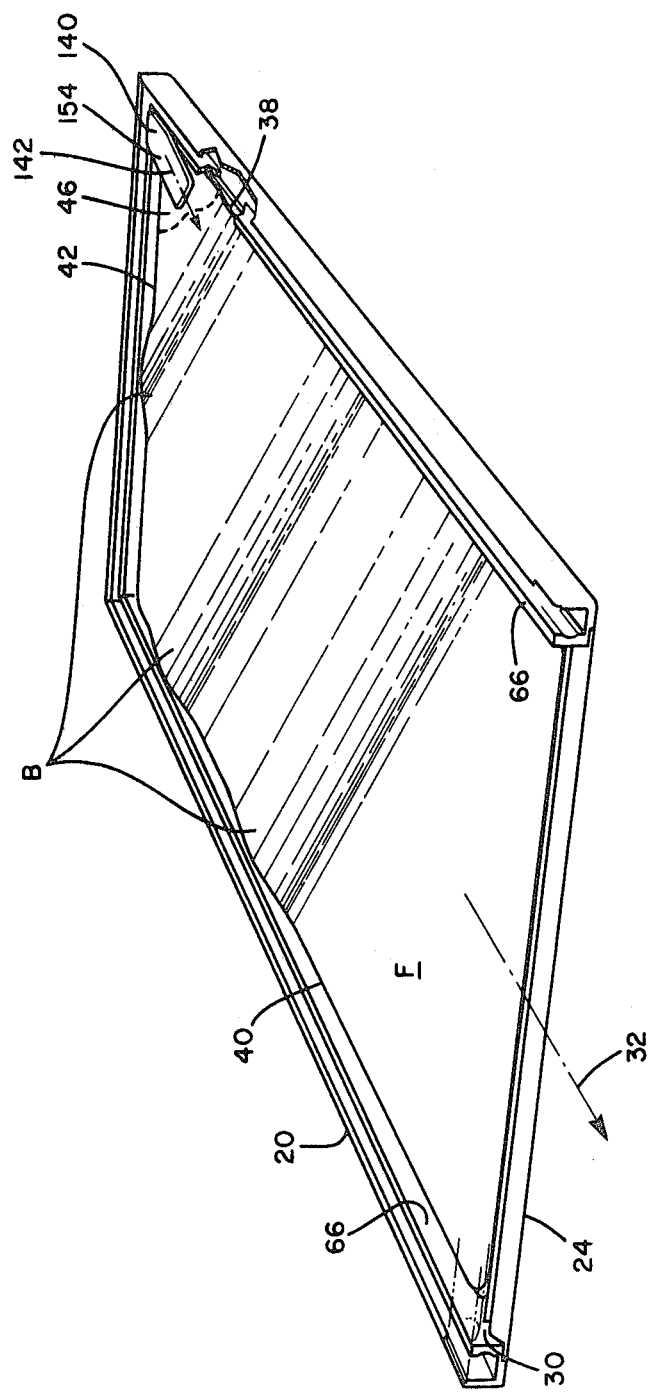
FIG. 12 is a perspective view of the cassette of FIG. 1 with parts thereof removed to illustrate, in exaggerated form, buckling of the film sheet in response to advancement of the film moving and indicating device to its FIG. 9 position.

After the film sheet has been exposed and is to be removed from the cassette for processing, as depicted schematically in FIG. 11 the cassette is positioned in cooperative relationship with suitably configured film processing apparatus P. When so positioned, the cassette is orineted vertically with its end wall 24 facing downward and joined in light-tight relation to the apparatus so that slot 30 is aligned with a film sheet inlet I thereon and buttons 102 are aligned with a pair of actuating pins Np adjacent to the inlet. When the cassette and apparatus are thus joined, the inlet is opened and buttons 102 are engaged and depressed by the pins so as to move bars 96 to their actuated positions, wherein screens 50 and 54 are spread apart and slot 30 is open. If the film sheet does not fall freely from the cassette by gravity alone, the user then manually actuates pusher part 154 toward slot end 152, as illustrated in FIG. 9, so that pusher part 156 engages film sheet corner part 46 at edges 38, 42 thereof and pushes the film sheet obliquely, relative to film path 32, toward housing walls 20, 24 and against housing side wall 20. When the film sheet is thus pushed against side wall 20, as shown exaggerated in FIG. 12, film sheet side edge 40 undergoes a buckling engagement with the adjacent surface of inner section 66 of that side wall, whereby the film sheet is buckled sufficiently, as at B, to create an air gap, and thereby reduce the aforementioned pseudo-optical contact, between the film sheet and the one of screen surfaces 52 and 56 to which it is clinging. The buckling effect so induced by such engagement with side wall 20, as the film sheet is simultaneously being pushed toward end wall 24, causes a complete separation of the film sheet from both screen surfaces, and thereby frees the film sheet for continued movement by gravity along path 32, out through slot 30, and into the processing apparatus.

The invention has beed described in detail with particular reference to the preferred embodiment thereof, but it will be understood that variations and modifications can be effected within the spirit and scope of the invention.

What is claimed is:

1. In a cassette for holding a photographic sheet, the cassette having one end with a slot therein through which the sheet is movable along an exit path, another end opposite said one end, one side joined to and forming a corner with said other end, and another side opposite said one side, an improvement comprising:
   means mounted near said corner and engageable with the sheet for moving the sheet obliquely, relative to the exit path, into buckling engagement with said other side prior to movement of the sheet along the exit path and through said slot, to thereby facilitate removal of the sheet from the cassette.

2. The improvement claimed in claim 1, the cassette also having a pair of facing substantially planar surfaces for supporting the sheet therebetween, wherein said buckling engagement creates an air gap between the sheet and one of said surfaces too facilitate separation of the sheet from said surfaces prior to said movement of the sheet along the exit path and through said slot.

3. The improvement claimed in claim 2, the cassette further having opposing front and rear covers connected to said ends and sides to enclose the sheet, wherein said moving means is slidably mounted on one of said covers for guided movement along a rectilinear path oblique to the exit path.

4. The improvement claimed in claim 3 wherein said rectilinear path extends from near said corner diagonally toward said one end and said other side at an angle between 15 and 60 degrees relative to the exit path.

5. The improvement claimed in claim 4 wherein said angle is one of 30 and 45 degrees.

6. The improvement claimed in claim 3 wherein said guided movement is limited to a predetermined range thereof extending from a point near said corner, and wherein said moving means is manually actuatable without sheet resistance to said guided movement through all of said range when the sheet is absent from the cassette but is so actuatable without sheet resistance through only a part of said range when the sheet is present in the cassette, whereby the relative amount of said guided movement obtainable without sheet resistance indicates whether the sheet is absent or present.

7. The improvement claimed in claim 6 wherein said rectilinear path is disposed at an angle of approximately 30 degrees relative to the exit path.

8. The improvement claimed in claim 7 wherein said part is approximately one-half said range.

9. A cassette for accomodating a substantially rectangular film sheet, the film sheet having front and rear surfaces, first and second side edges, and first and second end edges substantially perpendicular to the side edges, the front and rear surfaces together with the first side and first end edges defining a corner part of the film sheet, said cassette comprising:

a substantially rectangular-shaped housing including opposing front and rear walls spaced from each other in substantially parallel relationship, opposing first and second side walls spaced from each other and joined to said front and rear walls, and opposing first and second end walls spaced from each other and joined to said front, rear, and side walls, said front and rear walls together with said first side and first end walls defining a corner portion of said housing, all of said front, rear, side, and end walls defining a chamber for maintaining the film sheet in an operative position wherein its front and rear surfaces lie substantially parallel with said front and rear walls, its first and second side edges lie substantially alongside said first and second side walls, respectively, its first and second end edges lie near said first and second end walls, respectively, and its corner part lies within said corner portion of said housing, said second end wall having means defining a light-shielded opening through which the film sheet can pass along a film path into and out of said chamber; and means mounted in said corner portion of said housing for movement along an oblique path, defining an acute angle relative to the film path, and engageable with the corner part of the film sheet, when in its operative position, for moving the film sheet obliquely toward said second side and second end walls so as to urge the second side edge against said second side wall and thereby facilitate continued movement of the film sheet through said opening and out of said chamber.

10. A cassette as claimed in claim 9 further comprising front and rear sheet-like elements disposed in said chamber substantially parallel with said front and rear walls and having opposing substantially flat surfaces between which the film sheet is maintained adjacent thereto when in its operative position, and wherein said moving means, upon urging the second side edge against said second side wall, induces buckling of the film sheet and consequent separation thereof from one of said flat surfaces.

11. A cassette as claimed in claim 10 wherein said moving means is mounted for sliding movement on one of said front and rear walls and includes an externally accessible first part coupled to an internally extending second part configured to engage the film sheet corner part as its first side and first end edges.

12. A cassette as claimed in claim 11 wherein said one of said front and rear walls is said rear wall, and said first part is manually actuatable.

13. A cassette as claimed in claim 12 wherein said oblique path is delineated by a slot formed in said rear wall at said acute angle to receive and guide a mating part of said moving means intermediate said first and second parts.

14. A cassette as claimed in claim 13 wherein said acute angle has a magnitude between 15 and 60 degrees relative to the film path.

15. A cassette as claimed in claim 13 wherein said acute angle has a magnitude of one of 30 and 45 degrees relative to the film path.

16. A cassette as claimed in claim 13 wherein said first part is manually actuatable without film sheet resistance through a predetermined distance along said slot when the film sheet is absent from said chamber, but is so actuatable without film sheet resistance only through a noticeably shorter distance when the film sheet is present in its operative position, whereby the one of said predetermined and shorter distances through which said first part is manually actuatable without film sheet resistance indicates noticeably whether the film sheet is absent or present.

17. A cassette as claimed in claim 16 wherein said predetermined distance is approximately twice said shorter distance.

18. A cassette as claimed in claim 16 wherein said acute angle has a magnitude of approximately 30 degrees relative to the film path.

19. In a cassette for holding a radiation-sensitive sheet in an exposure position, the cassette having one end with a slot therein through which the sheet is movable along an exit path, another end opposite said one end, one side joined to said ends and forming a corner with said other end, another side opposite said one side and joined to said ends, opposing front and rear covers joined to said ends and sides, first and second substantially planar interior surfaces disposed between said covers in substantially parallel facing relationship with each other to support the sheet in said exposure position therebetween, pressure-applying means biasing said first surface toward said second surface to press the sheet flat against said second surface, and pressure-relieving means actuatable to urge said first surface away from said second surface and thereby relieve the sheet of pressure applied thereto, an improvement to facilitate removal of the sheet from said exposure position between said surfaces and out through said slot after said pressure-relieving means has been actuated, said improvement comprising:

means mounted on one of said covers near said corner for movement along a rectilinear path defining an actue angle relative to said exit path, and engageable with an adjacent portion of the sheet when in said exposure position, for moving the sheet obliquely toward said one end and said other side and into buckling engagement with said other side, to effect an air gap between the sheet and one of said surfaces and consequent separation of the sheet from said surfaces, thereby freeing the sheet for succeeding movement along said exit path and out through said slot.

20. The improvement claimed in claim 19 wherein said moving means is mounted on said rear cover for sliding movement along said rectilinear path, wherein said rectilinear path is delineated by a slot formed in said rear cover at said acute angle to receive and guide a mating part of said moving means, and wherein said moving means includes outer and inner parts interconnected by said mating part, said outer part being externally accessible for manual actuation, said inner part being configured and disposed to engage an adjacent edge portion of the sheet upon actuation of said first part.

21. The improvement claimed in claim 19 wherein said acute angle has a magnitude between 25 and 50 degrees relative to said exit path.

22. A method for readily dispensing a photographic sheet from a cassette, the cassette including an end wall with a slot therein through which the sheet is movable along an exit path, a side wall substantially perpendicular to said end wall, opposing front and rear cover walls joined to said end and side walls, first and second substantially planar interior surfaces disposed between said cover walls in substantially parallel facing relationship with each other to support the sheet therebetween, pressure-applying means biasing said first surface toward said second surface to press the sheet flat against said second surface, and pressure-relieving means actuatable to urge said first surface away from said second surface and thereby relieve the sheet of pressure applied thereto, said method comprising the steps of:

orienting the cassette vertically with said end wall facing downward;

actuating said pressure-relieving means to urge said first surface away from said second surface; and moving the sheet between said surfaces, in a direction oblique to said exit path, into buckling engagement with said side wall, to effect an air gap between the sheet and one of said surfaces and consequent separation of the sheet from said surfaces, thereby freeing the sheet for succeeding movement by force of gravity along said exit path and out through said slot.

23. A method as claimed in claim 22 wherein said moving step includes applying a force to a portion of the sheet remote from said end and side walls and directing said force obliquely toward said end and side walls.

24. A method as claimed in claim 22 wherein said moving step includes pushing upon an edge portion of the sheet diagonally opposite said end and side walls, said pushing being directed toward said end and side walls at an angle between 15 and 60 degrees relative to said exit path.

25. A method as claimed in claim 22, the sheet being configured to have a plurality of corner portions, wherein said moving step includes pushing upon the one of said corner portions that is farthest from said end and side walls, said pushing being directed toward said end walls along a rectilinear path disposed at an angle between 25 and 50 degrees relative to said exit path.

* * * * *